Patented Aug. 1, 1933

1,920,298

UNITED STATES PATENT OFFICE 1,920,298

MANUFACTURE OF RUBBER SUBSTITUTES AND PRODUCTS DERIVED THEREFROM

Mario Faldini, Milan, Italy, assignor to Società Italiana Pirelli, Milan, Italy, a Company of Italy No Drawing. Application June 24, 1931, Serial No. 546,669, and in Great Britain August 13, 1930

15 Claims. (Cl. 106—23.)

This invention relates to the manufacture and use of rubber substitute compositions.

It is well known that articles of rubber or the like may now be directly manufactured from natural or artificial aqueous dispersions of rubber or the like, principally from natural or artificial rubber latices. To such dispersions, compounding ingredients are generally added, such as sulphur, accelerators, zinc oxide, dyes, various forms of fillers and the like, in order to impart to the finished article produced from the dispersion the physical and mechanical properties desired.

It is now the object of the present invention to provide a rubber substitute composition which can be directly added to dispersions of rubber or the like of the kind referred to, the character of the composition being such as to ensure a homogeneous and otherwise satisfactory dispersion of the substitute particles in the body of latex or the like.

Vulcanised oils under the names of Brown Rubber Substitutes and Factices are already employed upon an extensive scale in the rubber industry.

These vulcanised-oil substitutes are usually obtained by sulphurising an unsaturated fatty oil such as rape oil (colza oil). Thus, for example, if such an oil be heated at about 160° C. with sulphur in the proportion of 14 to 18 per cent., reaction takes places and the fluid mixture becomes thicker until a point is reached when, on cooling, a solid mass results.

Rubber substitutes of the aforesaid kind when incorporated in rubber itself impart to rubber articles manufactured from the mixture advantageous properties, notably an improved degree of smoothness. They do not readily lend themselves, however, to use with rubber latices and like dispersions, on account of the difficulty and, in many cases, the impossibility of sufficiently finely and uniformly subdividing the substitute to ensure its proper dispersion in latex or the like.

According to the present invention, there is provided a process for the manufacture of a composition of brown substitute (factice) for direct addition to aqueous dispersions of rubber or the like, which comprises vulcanising a fatty oil by treatment thereof with sulphur at an elevated temperature in the usual way and while the vulcanised oil is still at a sufficiently elevated temperature from the vulcanising operation to be fluid (for example, at 90°–100° C.) emulsifying it with an aqueous solution or dispersion of a dispersing agent, so as to produce an emulsion which is first fluid and then gradually becomes viscous until, after a period of 40 hours or so, it assumes a paste-like consistency.

The actual vulcanising and emulsifying temperatures will depend, as will be understood, upon the particular oil used but are readily determinable by simple preparatory test. It may be stated, however, that the preferred oil for use according to the invention is colza oil, in which case, the vulcanising temperature is about 150° C. and the emulsifying temperature about 95° C.

Thus, the dispersing agent may be incorporated with the product of reaction of sulphur, which may be elemental sulphur, and an unsaturated fatty oil at the conclusion of the heating step and while the reaction-mixture is still fluid and hot. For example, the dispersing agent may be incorporated with such reaction-mixture in the fluid state during the cooling stage, for example, at a temperature of 100° to 90° C.

Among the dispersing agents which may be employed for the purpose are to be found those substances which belong to the class of protective colloids and are frequently employed in the rubber industry as stabilizers for rubber latex. Examples of such agents, suitable for the present invention, are fatty acid and resin soaps, saponin, casein and products of the type of Turkey-red oil, and such may be employed in their aqueous solutions or, probably more correctly speaking, their aqueous dispersions.

The invention includes the rubber substitute composition which is produced by the process specified above and also aqueous rubber dispersions, compounded or uncompounded with vulcanising agents, dyes, fillers and the like, having incorporated in them a rubber substitute in the form of a vulcanised fatty oil which has been introduced into the dispersion by the addition thereto of a rubber substitute composition produced by the said process specified. It is to be understood that the expression "fatty oil" is used to denote the natural oil and that the oil is fully vulcanised when it is submitted to emulsification, that is to say, no further vulcanisation is required for the formation of the substitute after the emulsification step.

The proportion of dispersing agent may vary within wide limits, according to the particular agent used, and a rule is not to be formulated. Thus, in the case of soap, the quantity of soap may vary from 4–12 per cent., in the case of casein from 2–10 per cent. and saponin from 0.5–4 per cent. reckoned by weight on the vulcanised oil. In any given case, however, a simple preliminary experiment suffices to determine a suitable proportion of the agent, as well as the most advantageous conditions of operation.

The stability of the dispersions prepared according to the invention appears to be of a high order, persisting for a long time; and they possess the property of mixing intimately and well with aqueous dispersions of rubber or the like, whether natural or artificial, yielding final-dispersions which are directly suitable for the manufacture of articles according to the process described in U. S. Specifications Nos. 1,717,248; 1,792,702; 1,750,540 or 1,811,695 or the process described in British Specification 292,964.

Such final-dispersions which, as required, may contain compounding ingredients, may be applied to the manufacture of articles of rubber or the like by any of the processes usually employed for such manufacture from rubber latex and like aqueous dispersions, for example, by forming or moulding, spreading on fabric, or impregnating films or fabric, and especially by the processes set forth in the prior specifications just enumerated.

In brief, the principle of the invention of the said United States Patent No. 1,717,248, consists in introducing into a coagulable aqueous dispersion of a plastic, such as rubber latex, a coagulant of the type that when added in suitably small proportion to the dispersion does not at the temperature of addition, for example, the ordinary temperature, produce coagulation and at the most a decrease in fluidity, but on appropriate application of heat promotes more or less rapid thickening followed by coagulation, and then subjecting the dispersion to localised heating to the forming-temperature of the article at the surface or surfaces at which the plastic is to be formed, so as to produce at said surface or surfaces a local thickening and the formation of a layer of compact coagulum.

Thus, the said process may be applied to the manufacture of rubber articles by internal or external moulding by bringing into contact latex containing a suitable proportion as aforesaid of a coagulant of the type defined and a heated mould or former, of the shape and size to give the desired article, heated to the forming-temperature, so as to produce at the surface of the mould or former a local thickening of the latex and the formation therefrom upon said surface of a layer of compact coagulated rubber.

By "forming-temperature" is meant the temperature at which the said local thickening and coagulation takes place—the temperature of forming or moulding the article; and "forming" includes moulding.

Operating in the said manner, articles of coherent rubber may be rapidly produced, the thickness of the rubber being determined by the time and the degree of heating. According also to the time and degree of heating, coagulation may be more or less complete, but in any event will be completed on subsequent drying.

Suitable coagulants of the type defined include organic and inorganic substances, and among these are generally to be found those bodies which when introduced in large quantities into latex are apt to coagulate it.

Appropriate inorganic coagulants of the type in question include salts of di-valent and tri-valent bases, such as salts of magnesium, calcium, zinc or aluminium, and ammonium salts of strong acids used in conjunction with oxides of metals of fixed bivalency of Group II of the Periodic Scheme of lower solubility in water, i. e. those oxides whose solubility in the hydrated state (hydroxides) does not at 95° C. exceed 2 per cent. in weight of the solution. Said oxides may be used in a proportion of from about 8–25 grams per litre of the latex. This is the proportion found to be generally utilizable with satisfactory results, but may, of course, be varied according to necessity. The oxides (or hydroxides) of strontium and barium have a dispersing action instead of a thickening and coagulating effect; while mercury oxide is inactive. Oxides of the type of calcium oxide by reason of their ready hydration are not to be distinguished for the purpose in question from the hydroxides; but in the case of others it is doubtful whether they act in the form of hydroxides, and when added in such form are frequently found much less active than the parent oxides. It is therefore advisable always to use the unhydrated oxide as such, although a simple preliminary experiment will suffice to determine the activity or otherwise of the form of any given oxide available, as well as the most advantageous proportion to employ of the particular reagent. The most active oxides are those of magnesium, calcium and zinc and such are the preferred co-operative agents for use with the ammonium salts. Examples of the latter are ammonium chloride, sulphate and nitrate; and the proportion may be about 10–30 grams per litre of the latex. As in the case of the oxides, this represents the generally applicable proportion, and may, likewise, be varied according to need. Mixtures of salts such as those of di- and tri-valent bases may be employed, and also the oxides of the said class may be used individually or in admixture along with the ammonium salts. Acids are in general not suitable coagulants.

Among suitable organic coagulants are aromatic di-substituted guanidines, for example, symm.-diphenylguanidine, symm.-phenyl-o-tolylguanidine, and symm.-di-o-tolylguanidine, and such may be employed in the proportion of from 0.5 to 2.5 per cent.

Such reagents may be added in solution or in suspension in water or other distributing agent or in a latex preservative, such as aqueous ammonia, when the latex is unpreserved or is deficient in preservative for the purpose in view.

If, for example, there be added to rubber latex, at a temperature below about 20° C., a very small quantity of a salt of the type described, for example, 3 grams of calcium sulphate dissolved or suspended in water per 1000 grams of dry residue of the latex, or one or other of the alternative coagulants or coagulant mixtures mentioned in an appropriate proportion as aforesaid, there may be some thickening, but coagulation does not take place, and if the proportion of coagulant has been suitably adjusted, which is a matter of simple preliminary experiment, the system may be preserved unaltered at or below the temperature stated for a considerable period of time, but if the latex so treated be brought to a higher temperature below the point of ebullition, for example, to a temperature between 75° and about 100° C.—according to the nature of the latex and the proportion of the coagulant—for instance, by introduction of a heated mould, the degree of thickening increases as the temperature is raised, and with the duration of the heating, until coagulation of the rubber takes place.

The natural or artificial aqueous dispersions which may be employed in conjunction with the substitute-dispersion include those of gutta-percha, balata, raw or re-claimed rubber, and vulcanized or natural rubber latex, which may be of normal content in rubber or concentrated, and the final dispersons produced with these materials may be utilised for the manufacture of objects of rubber or the like according to the principle of the invention of the aforesaid United States Patent No. 1,717,248.

Operating according to the principle of the said Letters Patent, articles of the most diverse kinds may be readily obtained, such, for example, as rubber sheet, rubberized fibres and fabrics, caps, gloves, teats, rods, threads, tubing and inner tubes for tyres. A method which is particularly advantageous as an alternative means of forming tubular articles by operation of the said process consists in causing a heated cylindrical core to travel through the heat-destabilised dispersion at such a rate as to emerge therefrom coated with a layer of compact coagulum. This particular method of making tubular articles carries with it the practical advantage that it permits a comparatively small bath to be used for the manufacture of articles of substantial size; a curved core may be used and it is possible readily to manufacture inner tubes and other tubular articles either of straight or circular form and having walls of variable thickness, as, for example, a thicker wall on that portion of the tube which is to form the tread portion.

It has been found that in the manufacture of articles of rubber direct from rubber latex by local heating thereof in presence of a coagulant of the type described according to United States Patent No. 1,717,248, the deposition of rubber, and consequently the production of the article, tends to proceed less advantageously with latex of normal rubber content, that is to say, latex containing up to about 38 per cent. of dry rubber, than with concentrated latex. With normal latex the formation of the rubber film or deposit at the heated surface may take place considerably more slowly, and but a limited thickness of rubber may be obtained.

Example I 85 kilograms of Colza oil and 15 kilograms of elemental sulphur were heated together with stirring for five hours at about 150° C. The mixing was allowed to cool to 95° C. and the still fluid mass was then slowly poured into a homogenizing plant, into which were simultaneously introduced 40 kilograms of a 3 per cent. aqueous solution of saponin. There resulted a still fluid somewhat viscous substance which, on a second passage through the plant, effected at once, commenced to display an increase in viscosity. Left to stand for 48 hours, a product of a paste-like consistency was obtained.

This product was found, as aforesaid, to possess a high degree of stability, and to be applicable to use for manufacture by itself or in admixture with aqueous dispersions of the type hereinbefore mentioned.

Example II 85 kilograms of Colza oil and 15 kilograms of elemental sulphur were heated together with stirring for five hours at about 150° C. The mixing was allowed to cool to 95° C. and the still fluid mass was then slowly poured into a homogenizing plant, into which were simultaneously introduced 100 kilograms of a 10 per cent. solution of casein in ammoniacal water. There resulted a viscous fluid which was passed a second time through the plant. The viscosity slightly increased during 48 hours after the preparation.

This product possessed a high degree of stability and was found to be applicable to use for manufacture by itself or in admixture with normal or concentrated latex, either natural of vulcanized and with or without the addition of compounding ingredients.

Example III 85 kilograms of Colza oil and 15 kilograms of elemental sulphur were heated together with stirring for five hours at about 150° C. The mixing was allowed to cool to 95° C. and the mass was then slowly poured into a homogenizing plant into which were simultaneously introduced 150 kilograms of an approximately 3 per cent. aqueous solution of neutral soap. The product was a viscous fluid, which was again passed through the plant. In this case also the viscosity slightly increased in a period of 48 hours after the preparation.

The product, as before, displayed a high degree of stability and was applicable to the same uses as indicated for the products obtained according to the other preceding examples.

Example IV

A compounded final-dispersion was made up as follows:—

| | |
|---|---|
| Normal rubber latex (about 33 per cent. dry rubber) | 10.00 Kg. |
| Substitute-dispersion at 75 per cent (prepared according to Example 1) | 2.00 Kg. |
| Sulphur | 60 Grams |
| Zinc oxide | 100 Grams |
| Ultra-accelerator | 10 Grams |
| Calcium sulphate | 50 Grams |

A stainless steel former for a finger stall, previously heated to 95° C., was immersed in the above compounded final-dispersion for 10 seconds. There was deposited upon the former a coating of a thickness of about 1 mm. which, after drying and vulcanization, presented great smoothness to the touch.

Example V

A compounded final-dispersion was made up as follows:—

| | |
|---|---|
| Concentrated rubber latex (about 50 per cent. dry rubber) | 10.00 Kg. |
| Substitute-dispersion at 75 per cent. (as in the previous example) | 3.00 Kg. |
| Calcium carbonate (in fine subdivision) | 3.00 Kg. |
| Sulphur | 60 Grams |
| Zinc oxide | 100 Grams |
| Ultra-accelerator | 10 Grams |
| Organic dyestuff | 10 Grams |
| Calcium sulphate | 50 Grams |

This compounded final-dispersion was proved by immersion of differently shaped heated formers to be suitable for the manufacture of articles of various kinds such, for example, as bathing caps, tobacco pouches and hand-grips, all of which proved in the finished state to be very smooth and of great softness.

Example VI

A compounded final-dispersion was made up as follows:—

| | Grams |
|---|---|
| Concentrated rubber latex (75 per cent. dry rubber) | 7,500 |
| Substitute-dispersion at 75 per cent. (as in the previous example) | 3,750 |
| Sulphur | 120 |
| Zinc oxide | 120 |
| Ultra-accelerator | 30 |

This compounded final-dispersion was found to be suitable for embodying with fibrous materials, such as cotton, silk, wool and other textile fabrics, by impregnation or spreading, and the so rubberized fibrous material was vulcanizable by the usual methods applicable for the vulcanization of fabricised rubber.

Example VII

A compounded final-dispersion was made up as follows:—

| | |
|---|---|
| Concentrated rubber latex (60 per cent. dry rubber) | 12.00 Kg. |
| Substitute-dispersion (as in Example II) | 5.00 Kg. |
| Sulphur | 100 Grams |
| Zinc oxide | 150 Grams |
| Ultra-accelerator | 15 Grams |

This compounded final-dispersion was found to be particularly applicable for the manufacture of gloves for domestic use.

It will be appreciated that the above examples are given for the purposes of illustration and not by way of limitation of the invention. The latter may be applied to the manufacture of substitute-dispersions and final dispersions from any of the known rubber substitutes which are normally solid or paste-like but are capable of being brought into the fluid condition and in such condition of undergoing emulsification.

As will be appreciated by those acquainted with the art, the product which is obtained in the process of this invention is distinguished from known rubber substitute dispersions composed of substitute of the type produced by reacting an oil with sulphur chloride, in that, unlike such known products, it is free from chlorine—a very important feature from the point of view of many industrial uses of the improved dispersion where the use of a chlorinated product would be inimical to operation or success.

What I claim is:—

1. A process for making a composition of brown substitute (factice) for direct addition to aqueous dispersions of rubber or the like, which comprises the steps of vulcanising a fatty oil by heat treatment thereof with sulphur and thereafter, while the vulcanised oil is still, from the vulcanising step, at a temperature between 90° and 100° C. to be fluid, emulsifying it by the addition with agitation of water containing a dispersing agent.

2. A process for making a composition of brown substitute (factice) for direct addition to aqueous dispersions of rubber or the like, which comprises the steps of vulcanising a fatty oil with sulphur and thereafter, while the vulcanised oil is still, from the vulcanising step, at a temperature between 90° and 100° C. to be fluid, emulsifying it by the addition with agitation of an aqueous solution of a soap.

3. A process for making a composition of brown substitute (factice) for direct addition to aqueous dispersions of rubber or the like, which comprises the steps of vulcanising a fatty oil by heat treatment thereof with sulphur and thereafter, while the vulcanised oil is still, from the vulcanising step, at a temperature between 90° and 100° C. to be fluid, emulsifying it by the addition with agitation of an aqueous solution of an alkali-fatty acid soap.

4. A process for making a composition of brown substitute (factice) for direct addition to aqueous dispersions of rubber or the like, which comprises the steps of vulcanising a fatty oil with sulphur and thereafter, while the vulcanised oil is still, from the vulcanising step, at a temperature between 90° and 100° C. to be fluid, emulsifying it by the addition with agitation of an aqueous solution of saponin.

5. A process for making a composition of brown substitute (factice) for direct addition to aqueous dispersions of rubber or the like, which comprises the steps of vulcanising a fatty oil with sulphur and thereafter, while the vulcanised oil is still, from the vulcanising step, at a temperature between 90° and 100° C. to be fluid, emulsifying it by the addition with agitation of a aqueous solution of casein.

6. A process for making a composition of brown substitute (factice) for direct addition to aqueous dispersions of rubber or the like, which comprises the steps of vulcanising a fatty oil by heat treatment thereof with sulphur, thereafter, while the vulcanised oil is still, from the vulcanising step, at a temperature between 90° and 100° C. to be fluid, introducing a charge of the oil into a mechanical mixer, and slowly pouring into it in the mixer, as the latter is being operated, water containing a dispersing agent and continuing the mixing until a completely homogeneous emulsion has been produced.

7. A process for making a composition of brown substitute (factice) for direct addition to aqueous dispersions of rubber or the like, which comprises the steps of vulcanising a fatty oil by treatment thereof with sulphur at a temperature in the neighbourhood of 150° C., thereafter, while the vulcanised oil is still, from the vulcanising step, at a temperature between 90° and 100° C. to be fluid, introducing a charge of the oil into a mechanical mixer, and slowly pouring into it in the mixer, as the latter is being operated, water containing a dispersion agent and continuing the mixing until a completely homogeneous emulsion has been produced.

8. A process for making a composition of brown substitute (factice) for direct addition to aqueous dispersions of rubber or the like, which comprises the steps of vulcanising a fatty oil by treatment thereof with sulphur at a temperature in the neighbourhood of 150° C., thereafter, upon the vulcanised oil having cooled down from the vulcanising temperature to a temperature in the neighbourhood of 90°–100° C. introducing a charge of the still-fluid oil into a mechanical mixer and slowly pouring into it in the mixer, as the latter is being operated, water containing a dispersing agent and continuing the mixing until a completely homogeneous emulsion has been produced.

9. The manufacture of a rubber composition consisting of an aqueous mixed dispersion of rubber and brown substitute (factice), which comprises vulcanising a fatty oil by heat treatment thereof with sulphur, thereafter, while the vulcanised oil is still, from the vulcanising step, at a temperature between 90° and 100° C. to be fluid, emulsifying it by the addition with agitation of water containing a dispersing agent and incorporating the resulting emulsion in an aqueous dispersion of rubber.

10. A process for making a rubber composition consisting of an aqueous mixed dispersion of rubber and brown substitute (factice), which comprises vulcanising a fatty oil by heat treatment thereof with sulphur, thereafter, while the vulcanised oil is still, from the vulcanising step, at a temperature between 90° and 100° C. to be fluid, introducing a charge of the oil into a mechanical mixer and slowly pouring into it, in the mixer, as the latter is being operated, water containing a dispersing agent, continuing the mixing until a completely homogeneous emulsion has been produced and incorporating the resulting emulsion in an aqueous dispersion of rubber.

11. The manufacture of a rubber latex composition containing brown substitute (factice), which comprises vulcanising a fatty oil by heat treatment thereof with sulphur, thereafter, while the vulcanised oil is still, from the vulcanising step, at a temperature between 90° and 100° C. to be fluid, emulsifying it by the addition with agitation of water containing a dispersing agent and incorporating the resulting emulsion in rubber latex.

12. A process for making a composition of brown substitute (factice) for direct addition to aqueous dispersions of rubber or the like, which comprises vulcanising a vegetable fatty oil by heating it with sulphur at a temperature in the neighbourhood of 150° C., allowing the resulting vulcanised oil to cool to a temperature in the neighbourhood of 95° C. and at this stage, while the vulcanised product is still fluid, emulsifying it by the addition with agitation of water containing a dispersing agent.

13. A process for making a composition of brown substitute (factice) for direct addition to aqueous dispersions of rubber or the like, which comprises vulcanising approximately 85 parts of colza oil with about 15 parts of elemental sulphur at a temperature in the neighbourhood of 150° C., allowing the vulcanised product to cool down to a temperature in the neighbourhood of 95° C. and at this stage, while the vulcanised oil is still fluid, emulsifying it by the addition with agitation of water containing a dispersing agent.

14. A process for making a composition of brown substitute (factice) for direct addition to aqueous dispersions of rubber or the like, which comprises vulcanising approximately 85 parts of colza oil with about 15 parts of elemental sulphur at a temperature in the neighbourhood of 150° C., allowing the vulcanised product to cool down to a temperature in the neighbourhood of 95° C., at this stage, while the vulcanised oil is still fluid, emulsifying it by the addition with agitation of water containing a dispersing agent and incorporating the resulting emulsion in rubber latex.

15. The manufacture of a vulcanisable rubber latex composition containing brown substitute (factice), which comprises vulcanising a fatty oil by heat treatment thereof with sulphur, thereafter, while the vulcanised oil is still, from the vulcanising step, at a temperature between 90° and 100° C. to be fluid, emulsifying it by the addition with agitation of water containing a dispersing agent and incorporating the resulting emulsion of brown substitute with rubber latex and an organic accelerator.

MARIO FALDINI.